No. 894,666. PATENTED JULY 28, 1908.
G. KLUMAK.
STOP WATCH.
APPLICATION FILED FEB. 11, 1907.

Witnesses:
Jgn Müller
L. H. Staaden.

Inventor:
Géza Klumak
by Alfred Müller
Atty.

UNITED STATES PATENT OFFICE.

GÉZA KLUMAK, OF VIENNA, AUSTRIA-HUNGARY.

STOP-WATCH.

No. 894,666.    Specification of Letters Patent.    Patented July 28, 1908.

Application filed February 11, 1907. Serial No. 356,862.

*To all whom it may concern:*

Be it known that I, GÉZA KLUMAK, subject of the King of Hungary, residing at Vienna, Austria-Hungary, have invented certain new and useful Improvements in Stop-Watches, of which the following is a specification.

The present invention relates to chronographs or stop-watches of the kind in which the rate of traveling of a car or other object between two points situated at a certain distance apart is read off directly on a scale along which the seconds hand moves.

The invention consists in certain improvements by which a very open and accurate reading may be obtained, the essential feature of this part of the invention comprising a scale having several concentric rings or spiral coils of numerals indicating the rate of traveling, each ring or each convolution corresponding to one revolution of the seconds hand so that for the first revolution the figures have to be read off, for instance on the outer ring, for the second one on the next inner ring, and so on. In combination with the division of the scale into several concentric rows or convolutions another hand is employed which indicates on a second scale at once on which ring or spiral convolution of the distance or rate scale the reading has to be taken.

In order to make the apparatus applicable for observations in which the distance between the two posts is different, the scale on which the rate of speed is read is so arranged on a special detachable glass cover that it can be easily replaced by a different scale, based on the required distance of posts.

The improved chronograph or stop-watch is preferably so arranged that the seconds hand performs one full revolution when the balance wheel which controls the movement of the work performs one hundred oscillations, each oscillation of the balance wheel being reduced to one-tenth of a second. The dial being divided into hundred tenths of a second, the tenth part of a second can be read off with perfect accuracy and fractions of the tenth part of a second can be easily estimated.

It is to be noted that stop-watches indicating directly the speed of a car between two posts at a known distance apart are well known in the art. Nor is it new to employ a balance the oscillation of which is reduced to one tenth of a second.

Figure 1:
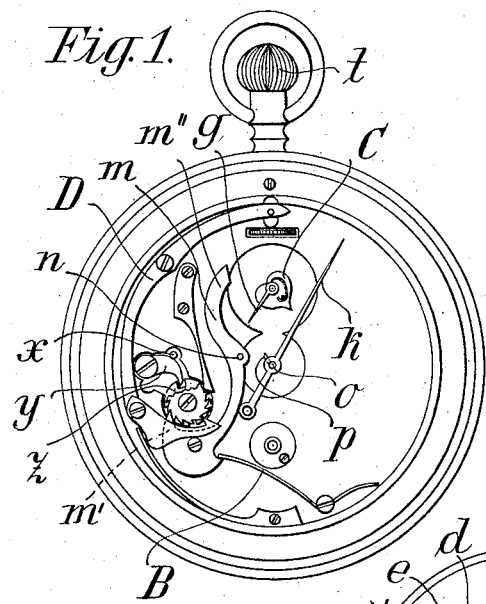
Figure 2:
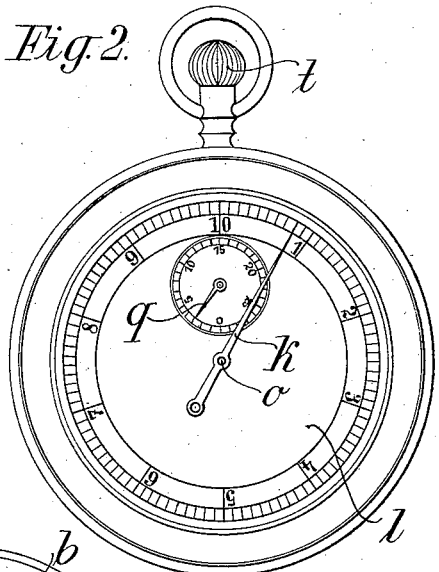
Figure 3:
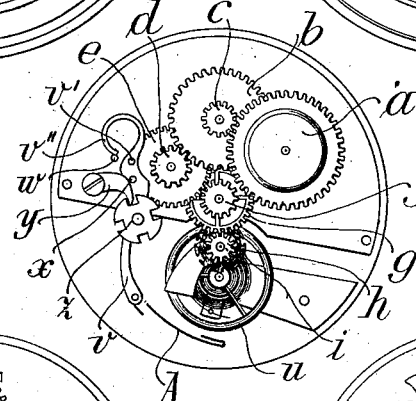
Figure 4:
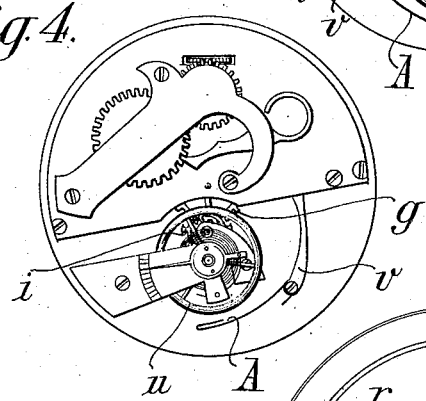
Figure 5:
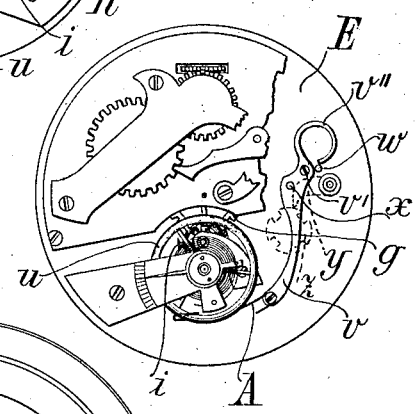
Figure 6:
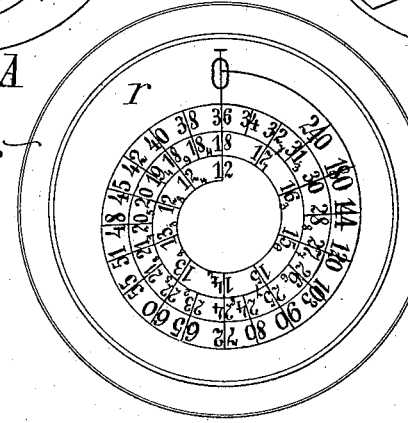

On the drawing, Figure 1 shows on an enlarged scale the essential parts of the mechanism, the dial being removed. Fig. 2 shows the stop watch with the dial in place. Fig. 3 shows the clock work mechanism proper, including the balance wheel; Figs. 4 and 5 are rear views of the clock work mechanism, some parts being broken away in Fig. 5 and the balance wheel being shown when arrested. Fig. 6 shows a distance scale to be placed over the dial.

In Fig. 3 is shown the train of wheels $a$, $b$, $c$, $d$, $e$, $f$, $g$, $h$, $i$, which are actuated by a spring provided in the wheel $a$, the motion of which spring is regulated in a well-known manner by the balance wheel $u$, the latter being so adjusted that it performs one oscillation in the time of one tenth of a second. The ratio of transmission of the said train of wheels is therefore so proportioned, that the wheel $f$, which has secured to it the arbor of the seconds hand $k$ performs one revolution while the balance wheel $u$ makes one hundred oscillations. Accordingly, the dial $l$ (Fig. 2), over which the seconds hand moves, is divided in ten seconds, and each of the divisions corresponding to a second is subdivided, each sub-division therefore corresponding to a tenth of a second.

In Figs. 1, 3, 4 and 5 is shown the mechanism for stopping or starting the stop-watch mechanism. On a disk E a lever $v$ is provided, having its pivot at $v'$, one end of the lever being shaped to form a spring-like loop $v''$ bearing against a pin $w$. From the lever $v$ projects a stud $x$, extending through an opening in the plate E and bearing against a pawl $y$, which is forced against a wheel $z$. The latter, as shown in Fig. 3, is provided at its face turned towards the lever $v$ with four rectangular recesses, whereas on the other face it is formed like a ratchet wheel (Fig. 1). The longer arm of the lever $v$ is shown as carrying a wire A, which is bent to form a hook of such shape as to embrace a segment of the balance wheel $u$, when the lever $v$ occupies the position shown in Fig. 5, in which position the pawl $y$ is lifted out of one of the recesses in the wheel $z$. As soon as the pawl $y$, however, drops into one of the four recesses, provided at the periphery of the wheel $z$, the hook-shaped wire A is removed from the balance wheel $u$ (see Figs. 3 and 4), the latter thus being permitted to continue its oscillations. When the hook A is retracted, it gives the balance wheel $u$ an impulse, whereby the starting of the stop-watch mechanism is insured. $m$ designates the stop lever for returning the hand to its zero position. The lever $m$ is provided with a pawl-shaped extension $m'$, which, under the influence of the spring B bears against the wheel $z$. The other end $m''$ of the lever $m$ acts upon the piece C of the recorder and the lever $m$ carries a pin $n$, against which bears a finger $p$ projecting from the arbor $o$ of the seconds hand $k$ and adapted to arrest said hand at its zero position. By the pressure on the button $t$, which pressure is transmitted to the pawl carrying lever D, the pawl-shaped extension $m'$ of lever $m$ is thrown into the ratchet teeth of the wheel $z$, whereas by the action of spring B the other end $m''$ of lever $m$ is forced against the piece C and the pin $n$ against the finger $p$, whereby the two hands $k$ and $q$ are returned to zero position. While the stop lever $m$ is thus depressed, the lever $v$ remains in the position shown in Fig. 5. When the button $t$ is pressed again, the pawl $y$ drops into one of the recesses of wheel $z$ above referred to, and the hook A in being withdrawn from the balance wheel $u$ starts the same, the hook A going into the position shown in Figs. 3 and 4, whereas the lever $m$ at the same time is moved into the position shown in Fig. 1. Upon a third pressure on the button $t$ the pawl $y$ is lifted out of the recess of wheel $z$, moving the lever $v$ back to its original position shown in Fig. 5, the pawl $y$ bearing against the pin $x$ projecting from said lever.

The special scale $r$ on which the rate of speed is read off can either be marked upon the dial $l$ itself or preferably upon a special glass cover, which, as shown in Fig. 3, is mounted in a rim $s$, adapted to be fitted to the front face of the watch in place of the usual watch glass, so that it can be easily replaced by another scale based on a different distance. The division of the scale is, for the purpose of clearness, so arranged that the numerals which, for example, with electric railways and motor cars may signify kilometers per hour, are arranged in concentric rings or spirals, each ring or each convolution corresponding to one revolution of the seconds hand, so that for the first revolution the figures have to be read off on the outer ring, for the second one on the next inner ring and so on.

If the watch is to be used for measuring the distance covered by a falling body, as for instance in measuring the depth of a mine shaft, the numerals of the distance scale have to be calculated from the known initial velocity of the body and its falling velocity.

If the two hands $k$ and $q$ stand at zero and if the button $t$ is pressed upon, the clock movement is set in motion; on pressing again on the button $t$ the clockwork is stopped whereupon from the position of the seconds hand $k$ can be read off upon the time scale in Fig. 2 the time which it took the moving object to pass through a predetermined distance (for example, in railways the distance between two division stones being 100 meters). Besides, from the scale $r$, at the point where the seconds hand crosses it, can be learned the speed (in kilometers per hour) at which the object traveled. If the hand $k$ stopped between two division lines the hundredth part of a second can be estimated. The pointer $q$ moves over a scale which is divided into ten seconds so that also the number of revolutions of the seconds hand can at once be read off and the corresponding ring or spiral convolution of the distance scale in Fig. 3 can be readily determined.

In the case of a falling body the button $t$ is effected at the moment when the body commences to fall, while it is pressed again on hearing the sound of the body when it strikes. The distance through which the body has fallen can then be read off directly, for example, in meters, from the point at which the hand, at the moment of stopping, crosses the distance scale in Fig. 3. Upon exerting a third pressure upon the button $t$ the small hand $q$ at once under the action of a spring returns to the zero position while the seconds hand continues its rotation in the same direction until it arrives at zero, where it is stopped because the arm $p$ will be brought into contact with the pin $n$ whereby the clockwork is stopped, until, by a fresh pressure upon the button $t$, the arm $p$ is again released.

Claim.

1. In a stop-watch the combination with a seconds hand, an arbor carrying the same, a clock-work moving the said hand with uniform speed over a dial divided into seconds and means adapted upon a pressure to set the clock-work into motion and arrest it at will, of a balance wheel, governing the movement of the clock-work and adapted to make one oscillation corresponding to a predetermined fraction of a second, a finger projecting from the arbor of the seconds hand, a stop-lever, and a pin secured thereto, the parts being so arranged, that the seconds hand is automatically arrested at zero position, after each complete revolution.

2. In a stop watch the combination with a seconds hand, an arbor carrying the same, a clock-work moving the said hand with a uniform speed over a dial divided into seconds and means adapted upon a pressure to set the clock work into motion and arrest it at will, of a balance wheel governing the movement of the clock-work and adapted to make one oscillation corresponding to a predetermined fraction of a second, means to automatically arrest the movement of the seconds hand at zero position, after each complete revolution, and a distance scale, comprising two or more concentrically or spirally arranged rows of numbers indicating the rate of speed during a given travel of the seconds hand, each row corresponding to one complete revolution of the seconds hand.

3. In a stop watch the combination with a seconds hand, an arbor carrying the same, a clock-work moving the said hand with uniform speed over a dial divided into seconds and means adapted upon a pressure to set the clock work into motion and arrest it at will, of a balance wheel, governing the movement of the clock-work and adapted to make one oscillation corresponding to a predetermined fraction of a second, means to automatically arrest the movement of the seconds hand at zero position after each complete revolution, a distance scale comprising two or more concentrically or spirally arranged rows of numbers indicating the rate of speed during a given travel of the seconds hand, each row corresponding to one complete revolution of the seconds hand.

4. In a stop watch, the combination with a seconds hand, an arbor carrying the same, a clock-work moving the said hand with uniform speed over a dial, divided into seconds, and means adapted upon a pressure to set the clock-work into motion and arrest it at will, of a balance wheel governing the movement of the clock-work and adapted to make one oscillation corresponding to a predetermined fraction of a second, means to automatically arrest the movement of the seconds hand at zero position after each complete revolution, a distance scale comprising two or more concentrically or spirally arranged rows of numbers indicating the rate of speed during a given travel of the seconds hand, each row corresponding to one complete revolution of the seconds hand, and another hand moving simultaneously with the seconds hand, but at a slower speed, over a dial, indicating the number of revolutions of the seconds hand.

5. In a stop-watch the combination with a seconds hand, a clock-work moving the same over a dial, divided into seconds and means adapted upon a pressure to set the clock work in motion and arrest it at will, of a balance wheel, governing the movement of the clock-work and a removable transparent cover provided with a distance scale, said scale comprising two or more concentrically or spirally arranged rows of numbers indicating the rate of speed for a given travel of the seconds hand, each row corresponding to one complete revolution of the seconds hand.

In testimony whereof I have hereunto set my hand in presence of two subscribing witnesses.

GÉZA KLUMAK.

Witnesses:
   JOSEF RUBARCH,
   ALVESTO S. HOGUE.